(12) United States Patent
Bos et al.

(10) Patent No.: US 8,829,147 B2
(45) Date of Patent: Sep. 9, 2014

(54) POLYMERIZABLE LIQUID COMPOSITION AND PROCESS FOR THE PRODUCTION OF ORGANIC GLASS STARTING FROM POLYMERIZABLE LIQUID COMPOSITIONS OF THE POLYURETHANE TYPE

(75) Inventors: Willem Bos, Arnhem (NL); Fiorenzo Renzi, Ravenna (IT); Roberto Forestieri, Ravenna (IT); Andrea Vecchione, Rimini (IT)

(73) Assignee: Acomon AG, Zug (CH)

( * ) Notice: Subject to any disclaimer, the term of this patent is extended or adjusted under 35 U.S.C. 154(b) by 398 days.

(21) Appl. No.: 13/124,570

(22) PCT Filed: Oct. 14, 2009

(86) PCT No.: PCT/EP2009/007389
§ 371 (c)(1),
(2), (4) Date: Jun. 27, 2011

(87) PCT Pub. No.: WO2010/043392
PCT Pub. Date: Apr. 22, 2010

(65) Prior Publication Data
US 2011/0251301 A1    Oct. 13, 2011

(30) Foreign Application Priority Data

Oct. 16, 2008    (IT) .............................. MI2008A1843

(51) Int. Cl.
| | | |
|---|---|---|
| B29D 22/00 | (2006.01) | |
| B32B 3/02 | (2006.01) | |
| B32B 27/00 | (2006.01) | |
| B32B 27/40 | (2006.01) | |
| B64C 1/10 | (2006.01) | |
| B64C 1/14 | (2006.01) | |
| B64D 7/00 | (2006.01) | |
| B64D 17/02 | (2006.01) | |
| C08G 18/00 | (2006.01) | |
| C08G 18/08 | (2006.01) | |
| C08G 18/10 | (2006.01) | |
| C08G 18/22 | (2006.01) | |
| C08G 18/28 | (2006.01) | |
| C08G 18/30 | (2006.01) | |
| C08G 18/70 | (2006.01) | |
| C08J 5/00 | (2006.01) | |
| C08L 75/00 | (2006.01) | |
| C09K 19/00 | (2006.01) | |
| E06B 3/00 | (2006.01) | |
| F16L 9/00 | (2006.01) | |
| G02B 6/00 | (2006.01) | |
| G02C 7/02 | (2006.01) | |

(52) U.S. Cl.
USPC ............ 528/51; 52/204.5; 138/118; 138/178; 264/331.19; 264/572; 244/121; 244/129.3; 244/145; 351/159.01; 359/237; 359/443; 359/642; 359/893; 428/1.3; 428/64.4; 428/423.1; 385/141; 524/589; 524/590; 528/44; 528/59; 528/60; 528/65; 528/66; 528/67; 528/85

(58) Field of Classification Search
USPC ............ 524/589, 590; 528/44, 51, 59, 60, 66, 528/67, 85, 65; 264/331.19, 572; 52/204.5; 244/121, 129.3, 145; 359/237, 443, 359/642, 893; 351/159.01; 428/1.3, 64.4, 428/423.1; 385/141; 138/118, 178
See application file for complete search history.

(56) References Cited

U.S. PATENT DOCUMENTS

| | | | |
|---|---|---|---|
| 4,101,529 | A | 7/1978 | Ammons |
| 4,808,690 | A | 2/1989 | Slagel |
| 2002/0153507 | A1 | 10/2002 | Savino et al. |
| 2005/0200033 | A1 | 9/2005 | Kadota et al. |

FOREIGN PATENT DOCUMENTS

EP    1 504 869    2/2005

OTHER PUBLICATIONS

International Search Report Issued Dec. 2, 2009 in PCT/EP09/007389 filed Oct. 14, 2009.

Primary Examiner — Patrick Niland
(74) Attorney, Agent, or Firm — Oblon, Spivak, McClelland, Maier & Neustadt, L.L.P.

(57) ABSTRACT

Polymerizable liquid compositions of the polyurethane type, consisting of two components (A) and (B), wherein component (A) contains at least one cyclo-aliphatic diisocyanate monomer or a mixture of one cyclo-aliphatic diisocyanate monomer and a pre-polymer obtained by reaction, in the presence of an acid phosphate ester catalyst, between said cyclo-aliphatic diisocyanate monomer and one or more polyols having two or more hydroxy 1 groups per molecule and a molecular weight ranging from 50 to 2,000 g/mole; the second component (B) contains one or more polyols having a molecular weight ranging from 50 to 2,000 g/mole and a functionality between 2 and 5; in the absence of polyalkoxylated tertiary diamines and organometallic catalysts, said components (A) and (B) being present in a weight ratio which varies from 1:1 to 2:1 and the process for the production of organic glass starting from polymerizable liquid compositions of the polyurethane type.

11 Claims, 4 Drawing Sheets

POLYMERIZABLE LIQUID COMPOSITION AND PROCESS FOR THE PRODUCTION OF ORGANIC GLASS STARTING FROM POLYMERIZABLE LIQUID COMPOSITIONS OF THE POLYURETHANE TYPE

The present invention relates to a polymerizable liquid composition and a process for the production of organic glass, having good optical and physico-mechanical properties, starting from polymerizable liquid compositions; it also relates to the organic glass obtained from the polymerization of said compositions.

More specifically, the process for the production of organic glass having good optical and physico-mechanical properties, according to the present invention, is applied to polymerizable liquid compositions of the polyurethane type essentially consisting of two components of which the first component (A) contains at least one cyclo-aliphatic diisocyanate monomer or a mixture of one cyclo-aliphatic diisocyanate monomer and a pre-polymer obtained by reaction between said cyclo-aliphatic diisocyanate monomer and one or more polyols, whereas the second component (B) contains one or more polyols.

The state of the art already describes numerous materials which have been developed for applications in the optical field, in particular for applications which require high transparency and the absence of colouring. Mineral glass has been the most widely-used material in the past, but more recently, it has been substituted by plastic polymeric materials which are lighter, have an improved impact strength and are easy to produce.

There are various types of commercially available polymeric materials, all having strong and weak points. Thermoplastic materials such as polymethylmethacrylate (PMMA) or polycarbonate (PC), for example, have the problem of low resistance to contact with most chemical products and solvents and a poor processability, as they tend to melt during mechanical processing such as surfacing, edging, drilling, grinding and polishing. Polycarbonate, moreover, has a high birefringence and chromatic aberration phenomena which make it unsuitable for high-quality optical applications.

For ophthalmic applications, in particular for the production of eye-glasses, thermosetting organic glass obtained from the polymerization of diethylene glycol bis(allyl carbonate), known with the name of Allyl Diglycol Carbonate (ADC) is of particular commercial interest due to its specific mechanical properties of aging resistance and processability, as described for example by F. Strain, in "Encyclopedia of Chemical Processing and Design", First Edition, Dekker Inc., New York, Vol. 11, page 452 onwards; and in "Encyclopedia of Polymer Science and Technology" (1964), Vol. 1, page 799 onwards, Interscience Publishers, New York.

The commercial success of ADC is due not only to the good properties of the polymerized products, but also to the production technique of the end-products, which is relatively simple, known as casting or manual casting.

By operating with this technique, the liquid compositions containing the polymerization initiator are poured into the cavity of a mould obtained by coupling two elements generally made of glass, separated by a distancing gasket made of a suitable material.

The liquid compositions are then subjected to polymerization inside the mould by means of thermal treatment with a gradual temperature increase, generally ranging from 30° C. to 110° C., with polymerization times which generally vary from 10 hours to 100 hours. At the end of the above treatment, the moulds are opened and the polymerized end-products are recovered.

The use of ADC, however, has various drawbacks which make the production process of the end-products, based on this composition, risky from the point of view of safety and also economically onerous.

The polymerization reaction of ADC is in fact normally carried out in the presence of peroxide initiators belonging to the group of dialkyl-peroxy dicarbonates, such as diisopropylperoxy-dicarbonate (IPP).

Solutions in which IPP is diluted in a variable concentration in the ADC monomer, are commercially available. This solution, which reduces the dangerousness associated with the thermal instability of the peroxide, does not, however, solve the problem of transportation and storage of the peroxide at unfavourable temperatures (i.e. at low temperatures). This solution also has the disadvantage of considerably increasing the quantity of initiator to be stored and managed daily and the operating costs.

In addition, once prepared, the solution of monomer with the catalyst must be used in short times to avoid premature polymerization reactions, or, again to avoid this problem, the casting must be effected at a low temperature (about 0° C.).

It can be easily deduced that this critical aspect represents a serious complication of the production process described above.

Finally, although the organic glass deriving from the polymerization of ADC has good optical and physico-mechanical properties, as previously specified, over the years the demand on the market for end-products having further enhanced optical and mechanical properties has increased considerably, in particular with reference to transparency, high toughness and impact strength.

There are also production processes of end-products alternative to casting, such as UV-curing, which are much more rapid and allow thermosetting organic glass to be obtained starting from multifunctional acrylic or methacrylic monomers. This organic glass, however, has a low impact strength and resistance to abrasion and poorer optical properties with respect to that obtained by polymerization of ADC.

Materials having a high impact strength based on polyurethane-urea polymers have recently been proposed, specifically for the field of ophthalmic lenses and as an alternative to polycarbonate, as described in U.S. Pat. No. 6,127,505 and in international patent application WO03/044071.

The lenses produced with these materials, however, still have, as in the case of polycarbonate, problems of processing, poor colourability with the immersion technique and, in addition, the lenses obtained tend to become yellow with time due to oxidation reactions.

In order to overcome the above disadvantages, however, patent application FR 2877006 claims the use of a bicomponent polyurethane resin (called "PX521HT" commercialized by the company Axson), comprising a component a) based on isocyanate, consisting of a mixture of 4,4'-methylene bis(cyclohexyl isocyanate) and a prepolymer of the above di-isocyanate and glycerol propoxylate and an alcohol component b), consisting of a mixture of alkoxylated glycerol etherate monomer and oligomer and at least one polyalkoxylated tertiary diamine.

The above patent application describes the use of this resin for the preparation of ophthalmic lenses by means of manual casting processes or with the use of RIM (Reaction Injection Molding) or RTM (Reaction Transfer Molding) machines.

It is known, however, that one of the fundamental requisites for the production on an industrial scale of lenses without optical defects, such as flow lines, bubbles, stresses etc., is the perfect homogeneity of the mixture of the two components, which is not easy to obtain with the two components described in the patent application in question, due to their poor chemical compatibility and high viscosity.

Homogeneous mixtures, in general and in particular for the above components, are normally obtained in fact after long mixing times at room temperature or in shorter times at higher temperatures. These conditions are not compatible with machines of the RIM or RTM type where the mixing operation is effected in a few seconds.

For the manual casting process such as that used for ADC, the stability in time of the polymerizable liquid composition becomes the critical parameter.

In the specific case of patent application FR'006, the stability of the mixture of components (a) and (b), defined with the term "pot-life", i.e. the time interval from the preparation of the mixture, in which its viscosity remains sufficiently low to allow its use, is extremely low due to the presence in component (b) of at least one polyalkoxylated tertiary diamine (see claims and description) and phenyl mercury neodecanoate (as obtained from the safety data sheets of the corresponding commercial product (Axson)), well-known and effective polymerization catalysts.

The polymerization reaction which is triggered as soon as the two components a) and b) are in contact with each other, accompanied by the rapid increase in viscosity, makes both the homogenization of the solution and the subsequent filling phase of the moulds extremely difficult and consequently with the composition according to FR'006 only a limited number of moulds can be filled making the process incompatible with industrial productive necessities.

The pot-life of the mixture is therefore too limited to allow a satisfactory industrial use of the same.

Analogous polymerizable compositions of the polyurethane type had already been described, for example in U.S. Pat. No. 4,101,529 and U.S. Pat. No. 4,808,690.

In the examples of these patents, polymerizable compositions without a catalyst, for improving the pot-life, are described which, however, require polymerization times and temperatures of 24-48 hours at 143° C. and 18 hours at 160° C. respectively, conditions which are not compatible with the production of lenses on an industrial scale.

US'529 describes the use, in the presence of a polymerization catalyst, of an acid phosphate ester, such as acid stearyl phosphate, as pot-life extender, which, when added to the polymerizable composition, facilitates the casting process inhibiting the polymerization reaction.

A subsequent patent, U.S. Pat. No. 4,434,284, claims a casting method in which the pot-life of a polyurethane reaction mixture is prolonged, said method consisting in melting and dissolving the polyols with a higher melting point in isocyanate at about 40° C. in the absence of a catalyst and subsequently adding the catalyst, such as for example dibutyl tin dilaurate, dissolved in the polyol with a lower melting point, at temperatures of about 15-18° C.

According to US'284, the above method allows the pot-life of the reaction mixture to be significantly improved with respect to the known art which envisages the melting and mixing of the polyols with the catalyst and subsequently the addition of isocyanate at temperatures in the order of 80° C.

An expert in the field, however, can easily deduce that the improvement in the pot-life is obtained to the detriment of the viscosity of the mixture which becomes extremely high and such as to not allow it to be used for the preparation of lenses on an industrial scale.

An objective of the present invention is consequently to overcome the drawbacks of the compositions and processes according to the state of the art, by producing new organic glass, without optical defects, having all the favourable characteristics of some already-existing materials, in particular the excellent optical properties, processability and dyeability of ADC polymers, but at the same time having an enhanced toughness and impact strength.

Furthermore, an objective of the present invention is also to find a process for the production of organic glass, i.e. end-products, starting from the new material, which is simple and inexpensive, and can be applied on an industrial scale.

The present invention allows both objectives to be achieved. It relates, in fact, to a simple casting process for the production of transparent end-products made of thermosetting plastic material of the polyurethane type having excellent physico-mechanical properties starting from polymerizable liquid compositions which form a further object of the present invention.

This casting process can be effected manually or by means of a mixing-dispensing machine.

A first object of the present invention therefore relates to polymerizable liquid compositions of the polyurethane type consisting of two components (A) and (B), wherein component (A) contains at least one cyclo-aliphatic diisocyanate monomer or a mixture of a cyclo-aliphatic diisocyanate monomer and a pre-polymer obtained by reaction, in the presence of an acid phosphate ester catalyst, between said cyclo-aliphatic diisocyanate monomer and one or more polyols having two or more hydroxyl groups per molecule and a molecular weight ranging from 50 to 2,000 g/mole; the second component (B) contains one or more polyols having a molecular weight ranging from 50 to 2,000 g/mole and a functionality between 2 and 5; in the absence of polyalkoxylated tertiary diamines and organometallic catalysts; said components (A) and (B) being present in a weight ratio which varies from 1:1 to 2:1.

In one of the two components (A) and (B), or in both, there is an acid phosphate ester catalyst and possibly other additives such as release agents, stabilizers, bluing agents for the colour correction, etc.

Furthermore, a further object of the present invention also relates to a process for the production of organic glass which envisages a casting process and the polymerization of polymerizable liquid compositions of the polyurethane type, comprising the following phases:

a mixing phase (a) of components (A) and (B) in a weight ratio which varies from 1:1 to 2:1, in the presence of an acid phosphate ester catalyst, wherein component (A) contains at least one cyclo-aliphatic diisocyanate monomer or a mixture of a cyclo-aliphatic diisocyanate monomer and a pre-polymer obtained by reaction between said cyclo-aliphatic diisocyanate monomer and one or more polyols having two or more hydroxyl groups per molecule and a molecular weight ranging from 50 to 2,000 g/mole; the second component (B)

contains one or more polyols having a molecular weight ranging from 50 to 2,000 g/mole and a functionality between 2 and 5; in the absence of polyalkoxylated tertiary diamines and organometallic catalysts and possibly in the presence of further additives;

a filtration phase (b) for eliminating possible dispersed contaminants, which is effected, alternatively or additionally, on the single components (A) and (B) separately before the mixing phase (a);

a filling phase (c) of one or more moulds by filling and subsequent polymerization of the liquid composition by thermal treatment with temperatures ranging from 30 to 110° C. and with polymerization times which vary from 1 hour to 30 hours, preferably from 3 to 20 hours.

An object of the present invention also relates to the organic glass obtained by the casting process and polymerization of said compositions.

Finally, a further object of the present invention relates to the end-products or optical articles comprising organic glass obtained by means of the casting process and polymerization of the polymerizable composition, such as, for example, ophthalmic lenses and solar filters, protective and safety screens, display windows, manifolds and solar and photovoltaic panels, substrates for optical disks, display panels and videoterminals.

It has in fact been surprisingly found that acid phosphate esters which, as indicated in U.S. Pat. No. 4,101,529, have the effect of extending the pot-life of polymerizable compositions of the polyurethane type containing a polymerization catalyst, are themselves effective polymerization catalysts, in the absence of any other polymerization catalyst.

Acid phosphate esters are also well-known mould release agents which, when added to the polymerizable composition, facilitate the detachment of the polymerized end-product from the mould.

It has now been surprisingly found that they are also effective polymerization catalysts of polyurethane resins.

In processes according to the known art, tertiary amines (for example triethylamine, tributylamine, N-methyl morpholine, triethylene diamine, diamine bicyclooctane (DABCO), triisopropanol amine etc.) or organometallic catalysts based on tin, titanium, mercury, zinc, bismuth, zirconium and mixtures thereof, as indicated for example in U.S. Pat. No. 6,590,057, are used as polymerization catalysts.

Examples of the most commonly used metallic catalysts are: dibutyl tin dilaurate, tetra ethyl titanate, tetra n-butyl titanate, tetra isobutyl titanate, bismuth versatate, bismuth stearate, bismuth neodecanoate, zinc neodecanoate, phenyl mercury neodecanoate etc. and mixtures thereof.

Among these organometallic catalysts, the most widely-used for the numerous applications of polyurethane resins are compounds of tin or mercury; this is due to their particular characteristic of guaranteeing a sufficiently long initial induction period in which the reaction proceeds slowly, followed by a phase in which the reaction proceeds rapidly and for a sufficient time for producing well-hardened polymeric articles.

It is well-known, however, that compounds based on mercury, such as phenyl mercury neodecanoate, are highly toxic, whereas in the case of tin-based catalysts such as dibutyl tin dilaurate, the toxic effects of tin alkyl impurities present in the catalyst are known.

The acid phosphate ester catalyst according to the present invention offers the advantages of catalysts based on mercury and/or tin without having the undesired effects of toxicity.

The catalytic capacity of acid phosphate esters in the polymerizable liquid compositions of the present invention is such as to allow a sufficiently long pot-life of the mixture of the two components (A) and (B) for guaranteeing a perfect homogenization of the mixture but, at the same time, it enables the complete hardening of the polymerized products, operating with polymerization cycles at temperatures which are compatible with an industrial production in the same way and under the same conditions as the most common and widely-used organometallic catalysts, such as for example phenyl mercury neodecanoate.

According to the present invention, the acid phosphate ester catalyst can be present in component (A) or (B) or in both, and in component (A) it can be present either in non-reacted form by means of simple mixing, or in reacted form with the aliphatic diisocyanate, as diisocyanate phosphate ester adduct.

In the preferred latter case, which offers the best results for the pot-life of the mixture of the two components (A) and (B), the acid phosphate ester is previously reacted with the diisocyanate at temperatures generally ranging from about 20° C. to about 100° C. for times of about 1 hour to about 10 hours.

Alternatively, the acid phosphate ester can be subsequently dosed in the mixture of the two components (A) and (B), obtaining however, with the same final concentration, a significant reduction in the pot-life.

In addition to the catalytic effect, the acid phosphate esters also maintain the function of mould release agent which is effectively manifested when the polymerization reaction, known as casting and described above, is carried out in moulds produced in various materials such as, for example, metallic or, in the case of the production of ophthalmic lenses, glass.

Should the adhesion of the end-product to the mould be too high, producing a high percentage of damaged moulds in the final opening phase, a further addition of other well-known mould release agents such as alkyl phosphates, silicone agents, non-ionic fluorinated surface-active agents, is possible according to the present invention.

It has also been found that a further extension of the pot-life of the polymerizable composition of the present invention can be obtained with the addition of amine compounds and more preferably sterically hindered amines, commercially known as light stabilizing additives with the name of HALS.

The polymerizable liquid compositions according to the present invention therefore allow articles having excellent optical and physico-mechanical properties to be produced on an industrial scale by means of simple and inexpensive casting techniques also in glass moulds.

The casting technique in moulds with which the organic glass according to the present invention is obtained starting from polymerizable liquid compositions of the polyurethane type, can be of the manual type, exactly like that described and used for ADC, or with the use of mixing-dispensing machines.

The two techniques for obtaining optical articles starting from the polymerizable compositions according to the present invention are briefly described hereunder.

Manual Casting

The manual casting process for the production of organic glass according to the present invention comprises the following phases:

a) mixing of the two components (A) and (B) in a suitable weight ratio.

Additives such as the acid phosphate ester catalyst, UV-absorbers, dyes, mould release agents of the present invention etc., can be added in this step, if they have not been previously added to the single components (A) and/or (B). As already indicated, the phosphate ester catalyst can be present in component (A) either in non-reacted form by means of simple mixing, or in reacted form with the aliphatic diisocyanate.

The mixing phase a) is effected at a temperature close to room temperature, i.e. ranging from 20° C. to 40° C. and at an absolute pressure ranging from 5 to 10 mbar until a homogeneous and limpid mixture is obtained.

It normally requires a time ranging from about 10 minutes to about 3 hours in relation to the composition itself, the temperature and type of mixer used.

During the mixing under vacuum, there is the complete degassing of the solution to guarantee the production of bubble-free polymerized optical articles.

After the mixing phase a), the process envisages a filtration phase b) for eliminating possible dispersed contaminants, which would jeopardize the optical quality of the end-product. Filters which can be used for the purpose are filters of the cartridge type made of polypropylene or nylon with a porosity of 0.5-1 microns absolute.

Alternatively or additionally, the filtration can be effected on the single components separately before the mixing phase.

This is followed by the filling phase c) of the moulds by filling and polymerization of the liquid composition by thermal treatment with temperatures ranging from 30 to 110° C., preferably from 40° C. to 100° C. and with polymerization times which normally vary from 1 hour to 30 hours, preferably from 3 to 20 hours.

The casting can be effected using moulds of various materials such as for example glass or metals.

Glass moulds are traditionally used for ophthalmic lenses, those made of metal, however, offer various advantages such as for example an improved capacity of dispersing the heat deriving from the polymerization reactions.

Suitable metallic moulds can be made of stainless steel, nickel, aluminum, copper, chromium, silver and gold.

The manual casting technique applied in the process according to the present invention is entirely similar to the casting technique used in the case of the ADC monomer but, with respect to this, the casting and polymerization process according to the present invention offers the advantage that the preparation of the polymerizable composition is effected at temperatures close to room temperature.

Casting with Mixing-Dispensing Machines.

As already mentioned, as an alternative to manual-type casting, the casting of the polymerizable composition of the present invention can also be carried out using a mixing-dispensing machine.

Figure 1:
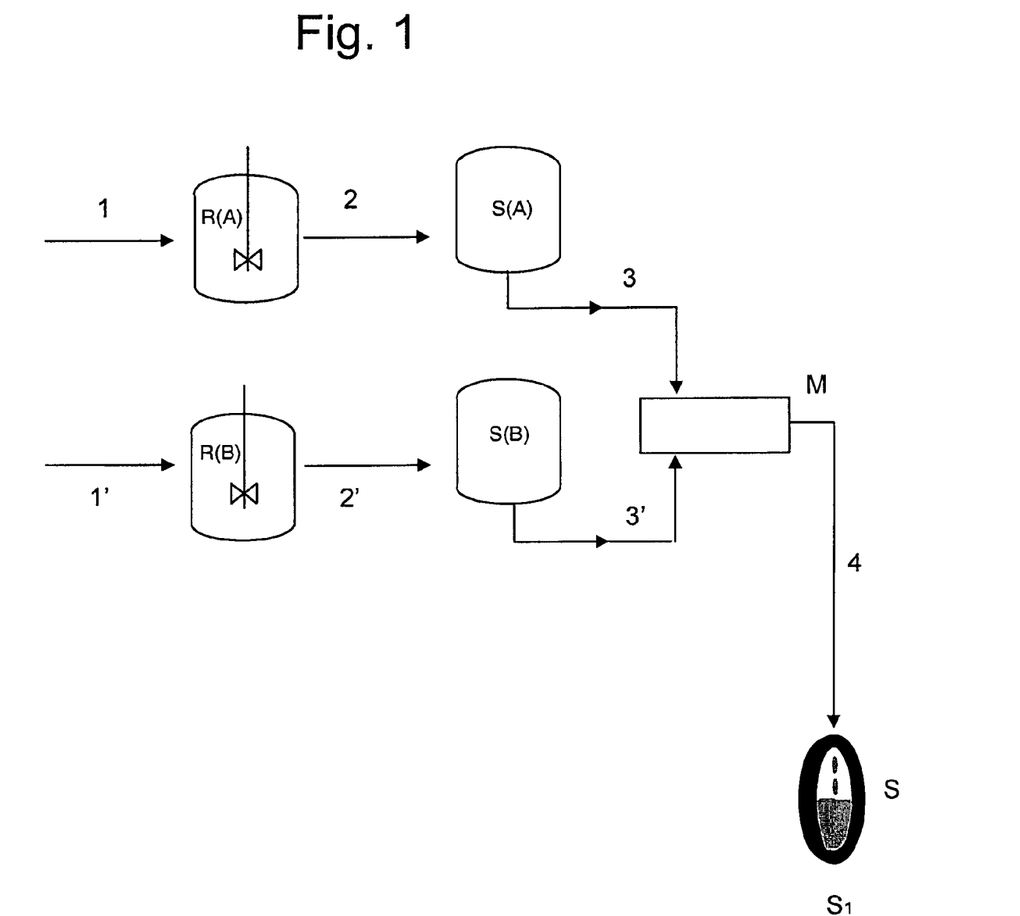
FIG. 1 is a schematic diagram of the method for producing an organic glass according to an embodiment of the present invention.

A scheme of the apparatus is provided in FIG. 1.

The machine essentially consists of:

Two stirred tanks R(A) and R(B) for the two components (A) and (B) respectively. The two tanks are equipped for the degassing of the liquids under vacuum;

Two membrane pumps which allow the passage, separately, of the two degassed liquids through appropriate filters made of polypropylene, not shown in the figure;

Two storage tanks S(A) and S(B) for the storage of the two filtered and degassed components;

Two gear pumps with a variable ratio fed by gravity by the two tanks S(A) and S(B), not shown in FIG. 1;

A Twinmixer gun, not shown in the figure;

A mixer M which mixes the two liquids at the outlet of the gun and supplies the mixture thus obtained directly to the mould filling section S.

With the exception of the two stirred tanks R(A) and R(B), all the other parts described above can be housed in a compact machine with limited dimensions, capable of mixing the two components (A) and (B) with a varying ratio as desired and at different temperatures, and distributing the polymerizable mixture also at a variable distribution rate, operating under the conditions envisaged in the process phases according to the present invention.

The casting process with a mixing-dispensing machine as described above, consists of the following operations:

feeding the two components (A) and (B) by means of lines (1) and (1') into the two respective stirred tanks R(A) and R(B). Additives such as UV stabilizers, dyes, mould release agents, etc., if not previously dissolved in the single components, can be added in this step in one of the two tanks or in both; the acid phosphate ester catalyst, on the other hand, is already present in component (A) which is preferably a mixture of a cyclo-aliphatic diisocyanate monomer and the prepolymer obtained by reaction, in the presence of an acid phosphate ester catalyst, between said cyclo-aliphatic diisocyanate monomer and one or more polyols having two or more hydroxyl groups per molecule and a molecular weight ranging from 50 to 2,000 g/moles;

degassing the liquids at about 40-60° C. for about two hours under vacuum and under stirring;

transferring the degassed liquids through lines (2) and (2') into the two storage tanks S(A) and S(B) by means of membrane pumps, with passage through polypropylene filters having a porosity of 1 micron;

dosing the two components (A) and (B) according to the weight ratio selected, by means of two gear pumps, from which they are sent separately through the respective tubes (3) and (3') to the Twinmixer gun and from this to the mixer M, which distributes the homogeneous polymerizable mixture thus obtained to the filling section of the moulds S.

The temperature in the transfer and dosage phases of components (A) and (B) described above and the distribution rate are selected on the basis of the physico-chemical properties of the composition used, the type of optical article to be produced and its complexity.

For the casting and polymerization of the liquid composition, the same considerations and conditions described above for casting of the manual type, are valid.

DETAILED DESCRIPTION OF THE PRESENT INVENTION

As already specified, the present invention relates to a casting and polymerization process of polymerizable liquid compositions of the polyurethane type for the production of organic glass having good optical and physico-mechanical properties.

The polyurethane polymerizable liquid composition according to the present invention consists of component (A) and component (B).

Component A

Component (A) of the polymerizable composition according to the present invention contains at least one cyclo-aliphatic diisocyanate monomer or a mixture of a cyclo-aliphatic diisocyanate monomer and a prepolymer obtained by reaction, in the presence of an acid phosphate ester catalyst, between said cyclo-aliphatic diisocyanate monomer and one or more polyols having two or more hydroxyl groups per molecule and a molecular weight ranging from 50 to 2,000 g/mole, preferably from 100 to 1,000 g/mole.

When the cyclo-aliphatic diisocyanate is present in component (A) of the polymerizable composition according to the present invention only in monomeric form, the final weight percentage of free isocyanate groups in said component (A) varies from approximately 20% to approximately 50% by weight with respect to the total weight of component (A) and preferably from 25% to 40% by weight with respect to the total weight of component (A).

In the case of mixtures of cyclo-aliphatic diisocyanate monomer and a prepolymer, the weight ratio between the two species is such that the final weight percentage of the free isocyanate groups in said component (A) varies from 20% to 30% by weight with respect to the total weight of component (A).

Non limiting examples of cyclo-aliphatic diisocyanate monomer of component (A) of the composition according to the present invention are: cyclohexane diisocyanate, methyl cyclohexane diisocyanate, bis(isocyanate methyl) cyclohexane, 4,4'-methylene bis(cyclohexyl isocyanate), 4,4'-isopropylidene bis(cyclohexyl isocyanate), 4,4'-dicyclohexylmethane diisocyanate), bis(isocyanatecyclohexyl)methane, bis(isocyanatecyclohexyl)-2,2-propane, bis(isocyanatecyclohexyl)-1,2-ethane, 3-isocyanate methyl-3,5,5-trimethylcyclohexyl isocyanate commonly known as isoforondiisocyanate, 2,5(6) diisocyanatemethylbicyclo(2,2,1)heptane and octahydro-4,7-methano-1H-indendimethyldiisocyanate.
The cyclo-aliphatic diisocyanate monomer of component (A) of the composition of the present invention is preferably selected from 4,4'-methylene bis(cyclohexylisocyanate) and bis(isocyanatemethyl)-cyclohexane.

The polyol used for the synthesis of the prepolymer of component (A) is at least a polyol having two or more hydroxyl groups per molecule and a molecular weight ranging from 50 to 2,000 g/mole, preferably from 100 to 1,000 g/mole.

Polyols which can be used for the purposes of the present invention are simple polyols such as, for example, ethylene glycol, diethylene glycol, triethylene glycol, tetra-ethylene glycol, propylene glycol, dipropylene glycol, tripropylene glycol, tetrapropylene glycol, 1,3-propanediol, 1,4-butanediol, neopentylglycol, 1,6-hexanediol, trimethylolpropane, ditrimethylol propane, glycerin, pentaerythrite, dipentaerythrite etc., or they can be selected from groups consisting of polyester polyols, polycaprolactone polyols, polyether polyols, polycarbonate polyols or mixtures thereof, and in the case of several polyols, these are independently selected from the groups indicated above, described for example in High Polymers, Vol. XVI; "Polyurethane Chemistry and Technology", of Saunders and Frisch, Interscience Publishers, New York, Vol. I, pages 32-42, 44-54 (1962) and Vol. II, pages 5-6, 198-199 (1964); and "Developments in Polyurethanes", Vol. I, J. M. Burst, ed., Applied Science Publishers, pages 1-76 (1978).

The polyester polyols are preferably selected from esters of polyols having from 2 to 10 carbon atoms, such as, for example, ethyleneglycol, propyleneglycol, diethyleneglycol, 1,4-butanediol, neopentylglycol, 1,6-hexanediol and dicarboxylic acids having from 4 to 10 carbon atoms such as, for example, adipic acid, succinic acid and sebacic acid. Among these, the most preferred are adipic esters of 1,4-butanediol, 1,6-hexanediol and 1,10-decanediol.

The polycaprolactone polyols are preferably reaction products of E-caprolactone with a low-molecular-weight polyol having from 2 to 10 carbon atoms preferably selected from 1,4-butanediol, 1,6-hexanediol, 1,10-decanediol and neopentylglycol.

The polyether polyols are preferably polytetramethyleneglycol (PTMG) or the condensation product of a polyol, more preferably glycerin or trimethylolpropane, with ethylene oxide and/or propylene oxide having a molecular weight ranging from 200 to 1,000 g/mole or mixtures thereof.

The polycarbonate polyols are preferably aliphatic polycarbonates containing 1,4-butanediol, 1,6-hexanediol, 1,10-decanediol, trimethylolpropane or neopentylglycol units.

The synthesis of the prepolymer of component (A) is carried out at temperatures ranging from 60 to 100° C., by progressively adding the polyol to the cyclo-aliphatic diisocyanate in an inert nitrogen atmosphere, in the presence of an acid phosphate ester catalyst. The reaction trend is followed by determining the concentration of residual isocyanate by titration. The quantity of polyol reacted is such that the final weight percentage of free isocyanate groups in component (A) ranges from 20% to 30% by weight with respect to the total weight of component (A), corresponding to a final concentration of cyclo-aliphatic diisocyanate monomer generally ranging from 70% to 97% by weight with respect to the total weight of component (A).

The use of a diisocyanate in monomeric form, or prevalently monomeric as previously specified, allows polymerizable compositions to be obtained, with very low viscosity values with respect to analogous products of the known art and this characteristic, combined with the high pot-life of the same composition allows perfectly homogeneous mixtures of the various components to be obtained and consequently the production of defect-free optical end-products on an industrial scale.

This characteristic is essential in particular for the production process of organic glass by means of the manual casting technique, object of the present invention, as it allows the filling of a considerable number of moulds in short times, thus satisfying the fundamental requisite at the basis of an industrial production.

Component (B)

Component (B) of the polymerizable composition according to the present invention consists of one or more polyols having a molecular weight ranging from 50 to 2,000 g/mole and preferably from 100 to 1,000 g/mole and a functionality ranging from 2 to 5 and preferably between 2 and 3.

The polyols of component (B) are selected from the polyols already listed in the definition of component (A) above.

The polyol of component (B) can be indifferently the same as or different from that used for the synthesis of the prepolymer of component (A).

The organic glass or optical articles according to the present invention are prepared by the polymerization reaction of components (A) and (B) according to suitable weight ratios generally ranging from 1:1 and 2:1, in the presence of appropriate catalysts and other additives described hereunder.

Catalyst

As already specified, the catalyst used for the production process of organic glass according to the present invention is selected from compounds belonging to the group of acid phosphate esters.

Preferred catalysts are monoesters and diesters of phosphoric acid or mixtures thereof which are capable of catalyzing the polymerization reaction and completing it.

They are respectively represented by formulae (I),

Formula (I)

wherein R is an alkyl group with from 1 to 10 carbon atoms, $R_1$ is an alkyl group having from 1 to 3 carbon atoms and n can be 0, 1 or 2, and formula (II)

Formula (II)

wherein $R_2$ and $R_4$ are alkyl groups having from 1 to 10 carbon atoms, $R_3$ and $R_5$ are alkyl groups having from 1 to 3 carbon atoms and m and p can be 0, 1 or 2.

Non-limiting examples of acid phosphate monoesters having formula (I) are: methyl phosphate, ethyl phosphate, isopropyl phosphate, butyl phosphate, octyl phosphate, decyl phosphate, dodecyl phosphate, stearyl phosphate, methoxyethyl phosphate, ethoxyethyl phosphate, propoxyethyl phosphate, butoxyethyl phosphate, pentyloxyethyl phosphate, isodecyloxyethyl phosphate, methoxypropyl phosphate, ethoxypropyl phosphate, propoxypropyl phosphate, butoxypropyl phosphate, and mixtures thereof.

Non-limiting examples of acid phosphate diesters having formula (II) are: dimethyl phosphate, diethyl phosphate, diisopropyl phosphate, dibutyl phosphate, dioctyl phosphate, bis(2-ethylhexyl) phosphate, diisodecyl phosphate, methoxyethyl-ethoxyethyl phosphate, methoxyethyl-propoxyethyl phosphate, ethoxyethyl-propoxyethyl phosphate, ethoxyethyl-butoxyethyl phosphate, di(methoxyethyl) phosphate, di(ethoxyethyl) phosphate, di(propoxyethyl) phosphate, di(butoxyethyl) phosphate, di(hexyloxyethyl) phosphate, di(decyloxyethyl) phosphate, di(methoxypropyl) phosphate, di(ethoxypropyl) phosphate, di(propoxylpropyl) phosphate and mixtures thereof.

The catalyst used in the process according to the present invention is preferably selected from $C_8$ monoester of phosphoric acid, $C_{10}$ monoester of phosphoric acid, $C_8$ diester of phosphoric acid, $C_{10}$ diester of phosphoric acid and/or mixtures thereof. Particularly preferred is a mixture of $C_8$, $C_{10}$ monoesters and diesters of phosphoric acid, wherein the monoesters are about 40% by weight and the diesters are about 60% by weight.

According to the present invention, the concentration of acid phosphate ester can vary from 0.2% to 3% by weight with respect to the total weight of the composition and preferably from 0.4% to 2% by weight with respect to the total weight of the composition.

The acid phosphate ester as catalyst can be present in component (A) or (B) or in both, and in component (A) it can be present either in non-reacted form (dissolved) or in reacted form with the cyclo-aliphatic diisocyanate.

In the latter case, the acid phosphate ester is previously reacted at temperatures ranging from about 20° C. to about 100° C. for times of about 1 hour to about 10 hours, in an inert atmosphere with the cyclo-aliphatic diisocyanate monomer or with a mixture of cyclo-aliphatic diisocyanate monomer and prepolymer obtained as described above.

Alternatively, the acid phosphate ester can be subsequently dosed in the mixture of the two components (A) and (B).

In order to obtain the maximum extension of the pot-life, the acid phosphate ester catalyst is preferably incorporated in the polymerizable composition of the present invention in the form previously reacted with the diisocyanate.

Additives

Further additives can be incorporated in component (A) or in component (B) or in both before the mixing phase or they can be added during the mixing phase of the two components.

Non-limiting examples of these additives are release agents such as alkyl phosphates, or non-ionic fluorinated surface-active agents, dyes, including photochromatic dyes, bluing agents, UV absorbers of the family of benzotriazoles, IR absorbers, antioxidants, such as for example the commercial product Irganox 1135 of Ciba.

A further improvement in the mechanical properties such as hardness, impact strength and resistance to abrasion can be obtained by the addition of inorganic nano-particles based on salts, or preferably based on zinc oxide, cerium oxide, silicon oxide, aluminum oxide, titanium oxide or zirconium oxide.

In particular, it has been surprisingly found that the addition of amines and more particularly tertiary amines and, specifically, sterically hindered amines, commercially known as light stabilizing additives with the name HALS, allow a further extension of the pot-life of the polymerizable composition of the present invention to be obtained, which, as will be illustrated in the following experimental examples, can be modulated in relation to their concentration.

Amine compounds which can be used for the purposes of the present invention are tertiary aliphatic amines such as, for example: triethylamine, benzyldimethylamine, n-methylmorpholine, dimethylcyclohexylamine, dimethylethanolamine, dimethylaminoethoxyethanol, triethanolamine, dimethyldipropylenetriamine, pentamethyldiethylenetriamine, bis(2-dimethylaminoethyl) ether.

Among amine products, sterically hindered amines known as HALS and in particular liquid tertiary amines are preferred, such as for example:

Methyl 1,2,2,6,6-pentamethyl-4-piperidinyl sebacate;

Mixtures of Methyl 1,2,2,6,6-pentamethyl-4-piperidinyl sebacate and Bis(1,2,2,6,6-pentamethyl-4-piperidinyl) sebacate;

Bis(1,2,2,6,6-pentamethyl-4-piperidinyl) sebacate;

Bis(2,2,6,6-tetramethyl-1-(octyloxy)-4-piperidinyl) sebacate.

According to the present invention, the concentration of sterically hindered tertiary amine can vary from 0.3% to 3.0% by weight with respect to the total weight of the composition and, preferably, from 0.5% to 2% by weight with respect to the total weight of the composition.

With respect to the above concentrations, the addition of said amine compounds does not jeopardize the optical and physico-mechanical properties of the polymerized products of the present invention as will be demonstrated in the following experimental examples.

With the polymerizable liquid composition according to the present invention, it is therefore possible to produce, on an industrial scale, articles having excellent optical and physico-mechanical properties by means of simple and inexpensive casting techniques also in glass moulds.

An object of the present invention also relates to the organic glass obtained by means of the casting and polymerization process of said compositions.

Finally, a further object of the present invention relates to end-products or optical articles comprising organic glass obtained with the casting and polymerization process of the polymerizable composition according to the present invention, as previously described, such as for example ophthalmic lenses and solar filters, Fresnel lenses, protective and safety screens, display windows, solar and photovoltaic manifolds and panels, substrates for optical disks, display panels and video-terminals, optical guides, components for mobile telephones, transparent tubes.

These optical manufactured products or articles can also be produced by processing with tools starting from blanks or semi-finished products.

Said optical manufactured products or articles can be surface hardened with scratch-proof coatings or they can be made anti-reflective with the techniques and materials normally used for ADC end-products.

As previously specified, the very low viscosity values of the polymerizable compositions according to the present invention combined with the high pot-life of the composition itself allows perfectly homogeneous mixtures of the various components to be obtained, and consequently the production of defect-free optical manufactured products, on an industrial scale.

This characteristic is particularly essential for the production process of organic glass by means of the manual casting technique, object of the present invention, as it allows the filling of a considerable number of moulds in short times, thus satisfying the fundamental requisite at the basis of an industrial production.

At the same time, the process according to the present invention does not have the disadvantages of the polyurethane and polyurethane-urea systems currently available which require the use of sophisticated and expensive mixing machines.

The polyurethane thermosetting plastic materials, i.e. the organic glass obtained with the process according to the present invention, have excellent optical properties and an excellent processability, similar to those which characterize ADC polymers but, with respect to the latter, they have a much higher impact strength and toughness. These characteristics make the material suitable for the production of complex end-products which cannot be obtained with ADC polymers.

The quantity of catalyst and additives in the process according to the present invention is optimized so as to obtain a sufficiently long pot-life of the solution and a reduced polymerization time in the mould which is economically advantageous, as will appear evident from the following experimental examples.

In these examples, flat sheets and ophthalmic lenses were prepared with the casting technique in moulds assembled as previously described and using, according to the cases, gaskets made of plasticized polyvinylchloride, ethylene-vinylacetate copolymer (EVA), low density polyethylene (LDPE), or any other suitable material, compatibly with the processing conditions.

The polymerizable liquid compositions were then subjected to polymerization by means of thermal treatment in a forced circulation oven, with a gradual temperature rise as described in the following experimental examples.

The physico-mechanical properties were determined on the polymerized products or organic glass thus obtained; in particular, the following characteristics were determined:

(a) Optical Characteristics

Refraction index ($n^D_{20}$): measured with an Abbe refractometer (ASTM D-542);

Yellow index (YI), (ASTM D-1925), determined with a Macbeth 1500 Plus spectrophotometer and defined as:

$$YI=100/Y \cdot (1.277X-1.06Z)$$

Light transmittance (ASTM D-1003), determined with a Macbeth Colour i5 spectrophotometer, and expressed as a tristimulus value Y;

Haze % (ASTM D-1003), determined with a Macbeth Colour i5 spectrophotometer.

(b) Physical and Mechanical Characteristics

Density: determined with hydrostatic scales at a temperature of 20° C. (ASTM D-792);

Rockwell hardness (M) measured with a Rockwell durometer (ASTM D-785);

Unnotched Izod impact strength (ASTM D-256 modified);

Deflection temperature under load 1.82 MPa (HDT) (ASTM D-648).

(c) Dyeability

The capacity of the material of adsorbing a dye on the surface was determined by the immersion of a neutral lens in an aqueous bath in which the dye BPI gray was dispersed.

For this purpose, the lens was immersed in said dye bath for 30 minutes at a temperature of 80° C. and, after rinsing with demineralized water, the transmittance of the lens was determined by measuring the chromatic coordinate Y as described by CIE (1931) Standard Observer.

(d) Chemical Resistance

The formation of defects in samples of flat plates was evaluated after immersion for 5 minutes in the following solvents: acetone, ethyl alcohol, $H_2SO_4$ (aqueous solution at 40%) and NaOH (aqueous solution at 10%).

The advantages deriving from the casting and polymerization process of the polymerizable compositions according to the present invention with respect to processes and compositions of the known art which in some cases are provided for comparative purposes, are evident from the following examples.

EXAMPLE 1

The compositions from nr. 1 to 3 were prepared according to the present invention, consisting of Components (A) and (B) in the quantities indicated in Table 1.

Component (A)

Component (A) is obtained by reacting for 3 hours at 90° C. and 5 mbar of pressure:

4,4'-methylene bis(cyclohexyl isocyanate)

varying quantities of catalyst consisting of a mixture of $C_8$ and $C_{10}$ monoesters and diesters of phosphoric acid, wherein the monoesters are about 40% by weight and the diesters are about 60% by weight.

Component (B)

Component (B) is obtained by mixing at 25° C. and 5 mbar of pressure:

propoxylated trimethylolpropane, having a hydroxyl number equal to 530 mg KOH/g and nominal molecular weight equal to 310 g/mole;

anthraquinone dye C.I. Solvent Violet 13, (solution at 0.01% in the polyol).

TABLE 1

| | | Composition n° | | |
|---|---|---|---|---|
| | | 1 | 2 | 3 |
| Component (A) (reaction prod.) | 4,4'-methylene bis(cyclohexyl isocyanate), g | 1315 | 1310 | 1303 |
| | Catalyst, g | 15 | 20 | 27 |
| Component (B) (mixture) | propoxylated trimethylolpropane, g | 997 | 997 | 997 |
| | Solvent Violet 13, g | 3 | 3 | 3 |
| | Weight ratio Comp. (A)/Comp. (B) | 1.33/1 | 1.33/1 | 1.33/1 |

Casting (Manual Casting)

1,330 g of component (A) and 1,000 g of component (B) previously prepared, were charged into a two-necked jacketed flask, equipped with a thermometer and magnetic stirrer, and the whole solution was mixed at 25° C. for about 1 hour at an absolute pressure of 5 mbar.

The degassed and limpid polymerizable solutions thus obtained were poured into nickelated stainless steel moulds and subjected to polymerization in a forced circulation oven with a gradual temperature increase from 40° C. to 95° C. in 15 hours (precisely from isotherm to 40° C. for 2 hours, temperature rise from 40 to 95° C. in 10 hours, followed by 3 hours in isotherm at 95° C.).

Flat sheets having a thickness of 3 mm and 5 mm and neutral lenses having a thickness of 2 mm were prepared with the compositions of Table 1, on which the characteristics indicated in Table 2 were determined.

For comparative purposes, the properties of the ADC polymer obtained by polymerization as previously described, are also indicated.

TABLE 2

| | | Composition n° | | | |
|---|---|---|---|---|---|
| | | 1 | 2 | 3 | ADC |
| Density, 20° C., g/ml | | 1.115 | 1.115 | 1.116 | 1.311 |
| YI[a] | | 0.21 | 0.19 | 0.23 | 1.20 |
| Light Transmittance, Y | | 92.5 | 92.5 | 92.5 | 92.5 |
| Haze, % | | 0.21 | 0.24 | 0.18 | 0.13 |
| Rockwell Hardness[a] | | 100 | 100 | 101 | 98 |
| Izod impact strength, KJ/m$^2$ | | 132 | 140 | 135 | 25 |
| HDT, ° C. | | 74 | 76 | 76 | 58 |
| $n^D{}_{20}$ | | 1.506 | 1.506 | 1.506 | 1.500 |
| Dyeability, Y | | 28.2 | 24.2 | 26.1 | 38.9 |
| Chemical resistance (defects) | Acetone $C_2H_5OH$ $H_2SO_4$ NaOH | No | No | No | No |

[a]Sheet thickness = 5 mm

The transparent polyurethanes according to the present invention show optical and physico-mechanical properties equal to or higher than those of the ADC polymer and much better Yellow Index (YI) and Light transmittance values with respect to those of the polyurethane-urea systems of the known art.

EXAMPLE 2

The compositions from nr. 4 to 6 were prepared according to the present invention, consisting of Components (A) and (B) in the quantities and under the conditions indicated in Table 3.

Component (A)

Component (A) is obtained by the reaction of 4,4'-methylene bis(cyclohexyl isocyanate) with 3% by weight of catalyst consisting of the mixture of monoesters and diesters of phosphoric acid of Example 1, under different reaction conditions.

Component (B)

Component (B) is obtained by mixing at 25° C. and 5 mbar of pressure:

propoxylated trimethylolpropane;

Trimethylol propane;

Solvent Violet 13 (solution at 0.01% in the polyol);

tertiary amine: mixture of 25% Methyl 1,2,2,6,6-pentamethyl-4-piperidinyl sebacate and 75% Bis(1,2,2,6,6-pentamethyl-4-piperidinyl) sebacate.

The same table also indicates, for comparative purposes, composition nr. 7 according to the present invention without addition of the tertiary amine.

TABLE 3

| | | Composition n° | | | |
|---|---|---|---|---|---|
| | | 4 | 5 | 6 | 7 |
| Component (A) (reaction prod.) | 4,4'-methylene bis(cyclohexyl isocyanate), g | 1358 | 1358 | 1358 | 1385 |
| | Catalyst, g | 42 | 42 | 42 | 15 |
| | Reaction conditions | 1 hr at 30° C. | 1 hr at 40° C. | 1 hr at 50° C. | 1 hr at 50° C. |
| Component (B) (mixture) | propoxylated trimethylolpropane, g | 894 | 894 | 894 | 877 |
| | Trimethylol propane, g | 73 | 73 | 73 | 73 |
| | Solvent Violet 13, g | 3 | 3 | 3 | 3 |
| | Tertiary amine, g | 30 | 30 | 30 | — |
| Weight ratio Comp. (A)/Comp. (B) | | 1.4/1 | 1.4/1 | 1.4/1 | 1.4/1 |

The polymerizable compositions from nr. 4 to nr. 7 according to the present invention were prepared by mixing Components (A) and (B) for about 2 hours at 30° C. and 5 mbar of pressure.

Figure 2:
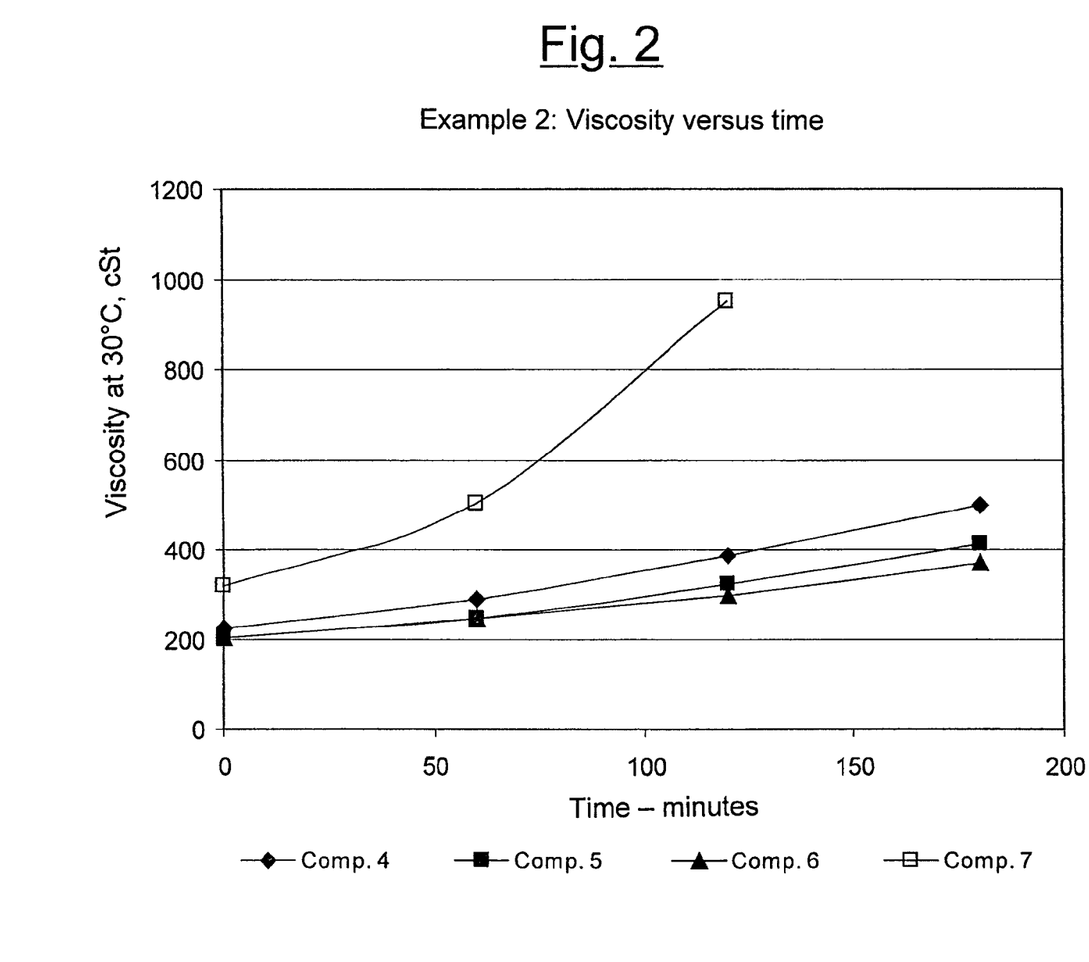
FIG. 2 is a graph of Viscosity vs. time as described in Example 2.

The initial viscosity and the viscosity at time intervals after the preparation at the same temperature were measured on the degassed and limpid solutions thus obtained, obtaining the values indicated in the graph of FIG. 2.

From the graph it can be seen that it is possible to vary the stability of the mixture according to the present invention by modifying the reaction conditions of the acid phosphate ester with the diisocyanate.

In particular, it is evident from the graph of FIG. 2 that with Composition nr. 6, even 3 hours after the preparation of the mixture, the increase in viscosity is extremely limited.

From comparing the viscosity trends of compositions 6 and 7 of FIG. 2, the stabilizing effect of tertiary amine is also evident, even though the content of catalyst in the latter is only equal to about ⅓ of that of Composition 6.

Flat sheets and neutral lenses were prepared with the liquid compositions from nr. 4 to nr. 6 of Table 4 of the present invention, according to the manual casting process described in Example 1, but with a polymerization cycle of 20 hours from 40° C. to 95° C. in 15 hours (specifically: isotherm at 40° C. for 2 hours, rise from 40 to 70° C. in 10 hours, rise from 70° C. to 100° C. in 3 hours, isotherm at 100° C. for 3 hours).

In this case, glass moulds normally adopted for the casting of ADC lenses were used, without revealing breakages of the moulds due to excessive adhesion.

The properties of the polymers obtained are indicated in Table 4, where it can be seen that transparent polyurethanes according to the present invention show excellent optical and physico-mechanical properties, completely analogous to those obtained with the polymerizable compositions of Example 1 of the present invention.

TABLE 4

| | Composition n° | | |
|---|---|---|---|
| | 4 | 5 | 6 |
| Density, 20° C., g/ml | 1.116 | 1.116 | 1.116 |
| YI[a] | 0.22 | 0.20 | 0.28 |
| Light transmittance, Y | 92.5 | 92.5 | 92.4 |
| Haze, % | 0.12 | 0.15 | 0.13 |
| Rockwell hardness[a] | 102 | 102 | 101 |
| Izod impact strength, KJ/m$^2$ | 139 | 135 | 129 |
| HDT, ° C. | 82 | 81 | 81 |
| $n^D{}_{20}$ | 1.506 | 1.506 | 1.506 |
| Dyeability, Y | 27.2 | 26.1 | 27.0 |

TABLE 4-continued

|  |  | Composition n° | | |
|---|---|---|---|---|
|  |  | 4 | 5 | 6 |
| Chemical resistance (defects) | Acetone $C_2H_5OH$ $H_2SO_4$ NaOH | No | No | No |

[a]Sheet thickness = 5 mm

EXAMPLE 3

The compositions from nr. 8 to 10 were prepared according to the present invention, consisting of Components (A) and (B) in the quantities and under the conditions indicated in Table 5.

Component (A)

Component (A) is obtained by the reaction of 4,4'-methylene bis(cyclohexyl isocyanate) with 3% by weight of catalyst consisting of the mixture of monoesters and diesters of phosphoric acid of Example 1.

Component (B)

Component (B) is obtained by mixing at 50° C. and 5 mbar of pressure:
propoxylated trimethylolpropane;
Trimethylol propane;
Solvent Violet 13 (solution at 0.01% in the polyol);
tertiary amine: mixture of 25% Methyl 1,2,2,6,6-pentamethyl-4-piperidinyl sebacate and 75% Bis(1,2,2,6,6-pentamethyl-4-piperidinyl) sebacate.

The same table also indicates, for comparative purposes, the comparative composition C.C.1. which uses the catalyst phenyl mercury neodecanoate of the known art instead of the acid phosphate ester of the present invention.

TABLE 5

| | | Composition n° | | | |
|---|---|---|---|---|---|
| | | 8 | 9 | 10 | C.C.1. |
| Component (A) (reaction prod.) | 4,4'-methylene bis(cyclohexyl isocyanate), g | 1309.5 | 1358 | 1406.5 | 1400 |
| | Catalyst, g | 40.5 | 42.0 | 43.5 | — |
| | Reaction conditions | 1 hr at 30° C. | 1 hr at 30° C. | 1 hr at 30° C. | — |
| Component (B) (mixture) | propoxylated trimethylolpropane, g | 894 | 894 | 894 | 923.8 |
| | Trimethylol propane, g | 73 | 73 | 73 | 73 |
| | Solvent Violet 13, g | 3 | 3 | 3 | 3 |
| | Tertiary amine, g | 30 | 30 | 30 | — |
| | Phenyl Mercury Neodecanoate, g | — | — | — | 0.2 |
| Weight ratio Comp. (A)/Comp. (B) | | 1.35/1 | 1.40/1 | 1.45/1 | 1.40/1 |

The polymerizable compositions from nr. 8 to 10 according to the present invention and the comparative composition C.C.1. were prepared by mixing the two Components (A) and (B) in different ratios for about 2 hours at 30° C. and 5 mbar of pressure.

Figure 3:
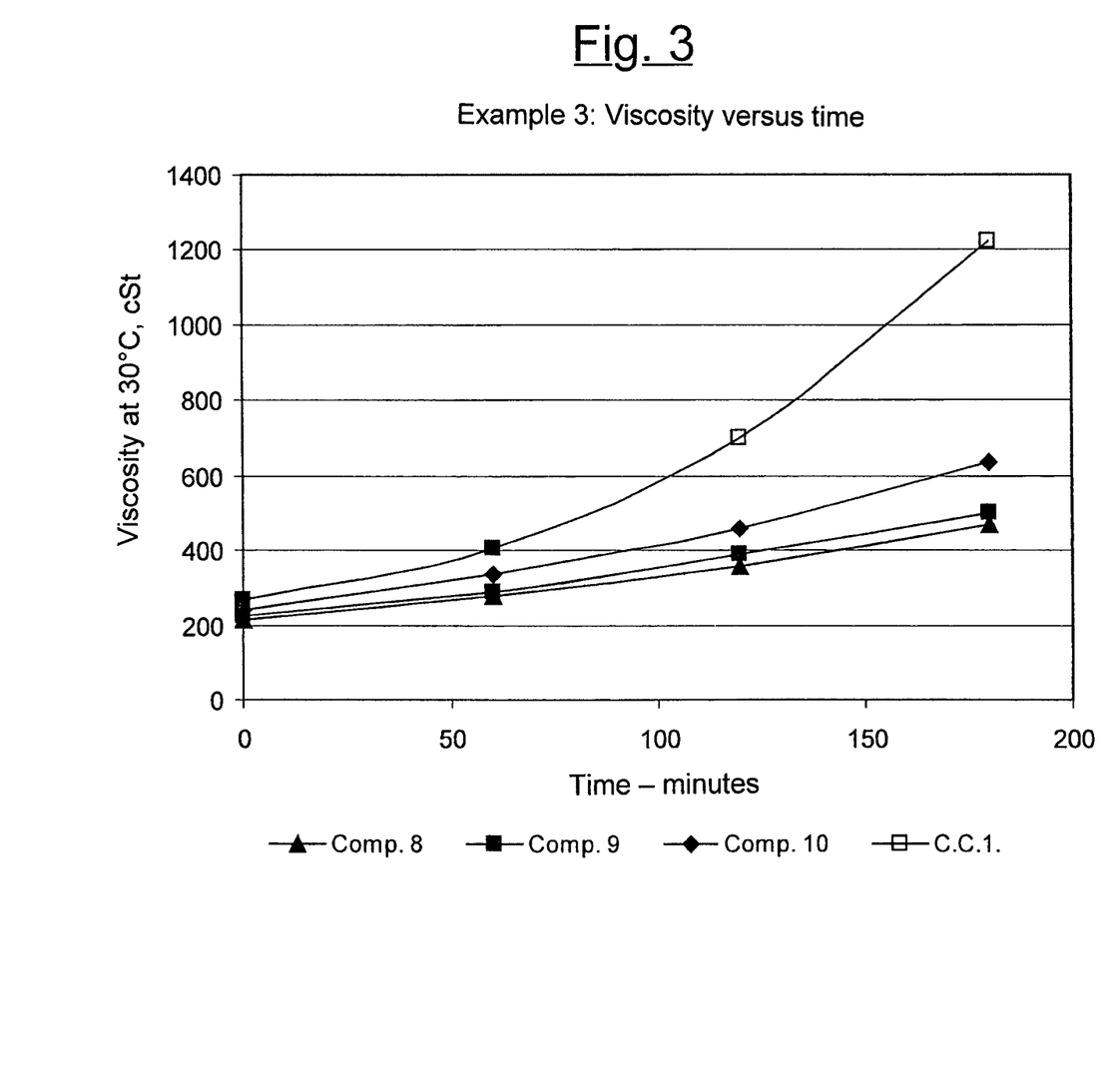
FIG. 3 is a graph of Viscosity vs. time as described in Example 3.

The initial viscosity and the viscosity at time intervals after the preparation at the same temperature were measured on the degassed and limpid solutions thus obtained, obtaining the values indicated in the graph of FIG. 3.

From the graph of FIG. 3, it can be seen that it is possible to vary the stability of the mixtures according to the present invention by modifying the weight ratio between Component (A) and Component (B), maintaining the increase in viscosity, however, within favourable values.

The comparative composition C.C.1. containing the mercury-based catalyst, on the contrary, shows a significant increase in the viscosity with time, which limits the possibility of using it with the manual casting technique.

A further comparative test was effected with composition nr. 9 according to the present invention and the comparative composition C.C.1., whose result is indicated in Table 6.

TABLE 6

| | Composition n° | |
|---|---|---|
| | 9 | C.C.1. |
| Mixing time Components (A) + (B), hours | 2 | 2 |
| Injection time of mixture in the moulds, hours | 3 | 3 |
| N° lenses injected (temperature 30° C.) | 210 | 88 |

With the polymerizable composition according to the present invention, it was possible to inject, in 3 hours, 210 semi-finished lenses having a diameter of 75 mm according to the glass mould casting process previously described, registering a significant slowing-down of the mould filling operation only towards the end of this period of time, whereas with the composition containing the catalyst of the known art based on mercury, under the same conditions, it was possible to inject a much lower number of lenses due to the rapid increase in viscosity.

EXAMPLE 4

The polymerizable composition nr. 11 was prepared, according to the present invention, consisting of Components (A) and (B) in as indicated in Table 7.

Component (A)

Component (A) is obtained by the reaction of 4,4'-methylene bis(cyclohexyl isocyanate) with 3% by weight of bis(2-ethylhexyl) phosphate.

Component (B)

Component (B) is obtained by mixing at 50° C. and 5 mbar of pressure:
propoxylated trimethylolpropane;
Trimethylol propane;
Solvent Violet 13 (solution at 0.01% in the polyol);
tertiary amine: mixture of 25% Methyl 1,2,2,6,6-pentamethyl-4-piperidinyl sebacate and 75% Bis(1,2,2,6,6-pentamethyl-4-piperidinyl) sebacate.

TABLE 7

| | | Composition n° |
|---|---|---|
| | | 11 |
| Component (A) (reaction prod.) | 4,4'-methylene bis(cyclohexyl isocyanate), g | 1358 |
| | Bis(2-ethylhexyl) phosphate, g | 42 |
| | Reaction conditions | 1 hr at 30° C. |
| Component (B) (mixture) | propoxylated trimethylolpropane, g | 894 |
| | Trimethylol propane, g | 73 |
| | Solvent Violet 13, g | 3 |
| | Tertiary amine, g | 30 |
| Weight ratio Comp. (A)/Comp. (B) | | 1.4/1 |

The polymerizable composition nr. 11 according to the present invention was prepared by mixing the two Components (A) and (B) for about 2 hours at 30° C. and 5 mbar of pressure.

Semi-finished monofocal lenses having a diameter of 75 mm were prepared with this composition according to the glass mould casting technique previously described with the yields indicated in Table 8.

TABLE 8

|  | Composition n° 11 |
|---|---|
| N° of moulds filled | 40 |
| N° of lenses obtained | 40 |
| N° of defect-free optical lenses | 40 |
| N° of broken/damaged moulds | 0 |

As can be observed, with the polymerizable composition of the present invention defect-free optical lenses were obtained in all cases and there was no broken or damaged mould in the opening phase.

EXAMPLE 5

The polymerizable composition nr. 12 was prepared, according to the present invention, consisting of Components (A) and (B) in as indicated in Table 9.

Component (A)

Component (A) was prepared by the reaction of 4,4'-methylene bis(cyclohexyl isocyanate), bis(2-ethylhexyl) phosphate and diethylene glycol (DEG).

2096 g of 4,4'-methylene bis(cyclohexyl isocyanate (8 moles) and 65 g of bis(2-ethylhexyl) phosphate where charged at room temperature into a three-necked jacketed flask, equipped with a thermometer and magnetic stirrer.

A vacuum of about 2 mbar, broken with anhydrous nitrogen was then applied. This operation was repeated 3 times in order to create an inert atmosphere.

74.2 g (0.7 moles) of diethylene glycol were then added slowly under stirring and a nitrogen head at 90° C.

The reaction was carried out at this temperature for about 6 hours, controlling the content of residual isocyanate groups with time, by means of titration.

At the end of the reaction, the reaction mixture was cooled and filtered on a 1 micron polypropylene filter thus obtaining about 2230 g of a liquid product having a viscosity at 25° C. equal to 75 cSt.

The product thus obtained is a mixture of 4,4'-methylene bis(cyclohexyl isocyanate) monomer as main component, the remaining part consisting of adducts of said cyclo-aliphatic diisocyanate with DEG and with bis(2-ethylhexyl)phosphate.

Component (B)

Component (B) is obtained by mixing at 25° C. and 5 mbar of pressure:
- propoxylated trimethylolpropane;
- Solvent Violet 13 (solution at 0.01% in the polyol);
- tertiary amine: mixture of 25% Methyl 1,2,2,6,6-pentamethyl-4-piperidinyl sebacate and 75% Bis(1,2,2,6,6-pentamethyl-4-piperidinyl) sebacate.

TABLE 9

|  |  | Composition n° 12 |
|---|---|---|
| Component (A) (reaction prod.) | 4,4'-methylene bis(cyclohexyl isocyanate) + DEG + bis(2-ethylhexyl) phosphate, g | 750 |
| Component (B) (mixture) | propoxylated trimethylolpropane, g | 482 |
|  | Solv. Violet 13, g | 3 |
|  | Tertiary amine, g | 15 |
| Weight ratio Comp. (A)/Comp. (B) |  | 1.5/1 |

Flat sheets and neutral lenses were prepared with the liquid composition nr. 12 according to the manual casting process described in Example 2, obtaining the results indicated in Table 10, where it can be seen that the transparent polyurethane obtained shows optimum optical and physico-mechanical properties, completely analogous to those obtained with the compositions of the previous examples.

TABLE 10

|  | Composition n° 12 |
|---|---|
| Density, 20° C., g/ml | 1.115 |
| YI[a] | 0.21 |
| Light transmittance, Y | 92.5 |
| Haze, % | 0.1 |
| Rockwell Hardness[a] | 101 |
| Izod impact strength, KJ/m$^2$ | 145 |
| HDT, ° C. | 76 |
| n$^D_{20}$ | 1.506 |

[a]Sheet thickness = 5 mm

Semi-finished monofocal lenses were also prepared with the liquid composition nr. 12, using a mixing-dispensing machine, operating according to the conditions previously described.

Glass moulds normally adopted for the casting of ADC lenses were used for the above test.

At the end of the polymerization, lenses having a diameter of 75 mm were obtained with the yields indicated in Table 11.

TABLE 11

|  | Composition n° 12 |
|---|---|
| N° of lenses injected (Temperature 40° C.) | 20 |
| N° of lenses obtained | 20 |
| N° of defect-free optical lenses | 20 |
| N° of broken/damaged moulds | 0 |

The results of the above Table confirm that with the polymerizable composition of the present invention defect-free optical lenses can be produced with very high yields by means of the casting technique with a mixing-dispensing machine using normal glass moulds.

EXAMPLE 6

The compositions nr. 13 and 14 were prepared according to the present invention, consisting of Components (A) and (B) in the quantities and under the conditions indicated in Table 12.

Component (A)

Component (A) is obtained by the reaction of 4,4'-methylene bis(cyclohexyl isocyanate) with 3% by weight of catalyst consisting of the mixture of monoesters and diesters of phosphoric acid of Example 1.

Component (B)

Component (B) is obtained by mixing at 50° C. and 5 mbar of pressure:
propoxylated trimethylolpropane;
Trimethylol propane;
Tetraethylene glycol (Composition n° 13)
Tripropylene glycol (Composition n° 14)
Solvent Violet 13 (solution at 0.01% in the polyol);
tertiary amine: mixture of 25% Methyl 1,2,2,6,6-pentamethyl-4-piperidinyl sebacate and 75% Bis(1,2,2,6,6-pentamethyl-4-piperidinyl) sebacate.

TABLE 12

| | | Composition n° | |
|---|---|---|---|
| | | 13 | 14 |
| Component (A) (reaction prod.) | 4,4'-methylene bis(cyclohexyl isocyanate), g | 1456.5 | 1416 |
| | Catalyst, g | 43.5 | 44 |
| | Reaction conditions | 1 hr at 30° C. | 1 hr at 30° C. |
| Component (B) (mixture) | propoxylated trimethylolpropane, g | 666 | 686 |
| | Trimethylol propane, g | 106 | 80 |
| | Tetraethylene glycol, g | 194 | — |
| | Tripropylene glycol | — | 200 |
| | Solvent Violet 13, g | 3.5 | 3.5 |
| | Tertiary amine, g | 30.5 | 30.5 |
| Weight ratio Comp. (A)/Comp. (B) | | 1.5/1 | 1.46/1 |

The polymerizable compositions nr. 13 and 14 according to the present invention were prepared by mixing the two Components (A) and (B) for about 2 hours at 30° C. and 5 mbar of pressure.

Figure 4:
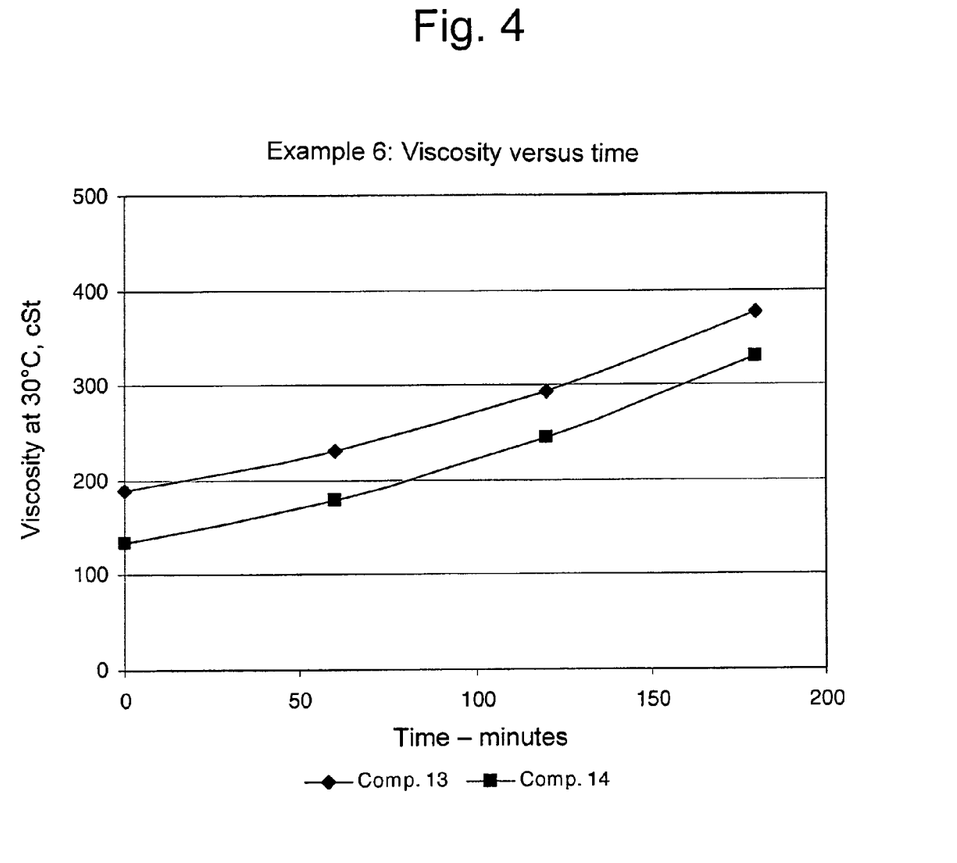
FIG. 4 is a graph of Viscosity vs. time as described in Example 6.

The initial viscosity and the viscosity at time intervals after the preparation at the same temperature were measured on the degassed and limpid solutions thus obtained, obtaining the values indicated in the graph of FIG. 4.

From the graph of FIG. 4, it can be seen that the addition of glycol allows a further reduction in the viscosity of the polymerizable composition and a further increase in the pot-life according to the objectives of the present invention.

Flat sheets and neutral lenses were prepared with the polymerizable composition nr. 13 according to the manual casting process described in Example 2.

The properties of the polymer obtained are indicated in Table 13, where it can be seen that the transparent polyurethane according to the present invention shows optimum optical and physico-mechanical properties and in particular an excellent impact strength.

TABLE 13

| | Composition n° 13 |
|---|---|
| Density, 20° C., g/ml | 1.113 |
| YI[a] | 0.32 |
| Light transmittance, Y | 92.5 |
| Haze, % | 0.15 |
| Rockwell Hardness[a] | 101 |
| Izod impact strength, KJ/m$^2$ | 180 |
| HDT, ° C. | 78 |
| n$^D_{20}$ | 1.508 |
| Dyeability, Y | 22.5 |

[a]Sheet thickness = 5 mm

The invention claimed is:

1. A polymerizable liquid composition, comprising:
(A) at least one cycloaliphatic diisocyanate monomer or a mixture of a cycloaliphatic diisocyanate monomer and a prepolymer;
(B) at least one polyol having a functionality between 2 and 5 selected from the group consisting of ethylene glycol, diethylene glycol, triethylene glycol, tetra-ethylene glycol, propylene glycol, dipropylene glycol, tripropylene glycol, tetrapropylene glycol, 1,3-propanediol, 1,4-butanediol, neopentylglycol, 1,6-hexanediol, trimethylolpropane, ditrimethylol propane, glycerin, pentaerythritol, dipentaerythritol and a propoxylated trimethylolpropane having a hydroxyl number of 530 mg KOH/g and a nominal molecular weight of 310 g/mol; and
an acid phosphate ester of formula (I) and/or of formula (II):

wherein R is an alkyl group with from 1 to 10 carbon atoms, R$_1$ is an alkyl group having from 1 to 3 carbon atoms and n is 0, 1 or 2, wherein R$_2$ and R$_4$ are each independently, alkyl groups having from 1 to 10 carbon atoms, R$_3$ and R$_5$ are each independently, alkyl groups having from 1 to 3 carbon atoms and m and p are each independently, 0, 1 or 2;
wherein
the prepolymer is obtained by reaction of the at least one cycloaliphatic diisocyanate monomer with the at least one polyol catalyzed by the acid phosphate ester, with the proviso that
no polyalkoxylated tertiary diamine or metal organic catalyst is present in the composition, and
a weight ratio of (A) to (B) is from 1:1 to 2:1.

2. The polymerizable composition according to claim 1, further comprising at least one additive selected from the group consisting of release agents, stabilisers, and optical brighteners.

3. The polymerizable composition according to claim 1, wherein the phosphate acid ester of formula I and/or formula II is in a reacted or unreacted form with the cycloaliphatic diisocyanate.

4. The polymerizable composition according to claim 1, further comprising an aliphatic tertiary amine.

5. A method for producing organic glass, comprising:
a) mixing components comprising:
(A) at least one cycloaliphatic diisocyanate monomer or a mixture of a cycloaliphatic diisocyanate monomer and a prepolymer,
(B) at least one polyol having a functionality between 2 and 5 selected from the group consisting of ethylene glycol, diethylene glycol, triethylene glycol, tetra-ethylene glycol, propylene glycol, dipropylene glycol, tripropylene glycol, tetrapropylene glycol, 1,3-propanediol, 1,4-butanediol, neopentylglycol, 1,6-hexanediol, trimethylolpropane, ditrimethylol propane, glycerin, pentaerythritol, dipentaerythritol, and an acid phosphate ester of formula (I) and/or of formula (II):

(I)

wherein R is an alkyl group with from 1 to 10 carbon atoms, $R_1$ is an alkyl group having from 1 to 3 carbon atoms and n is 0, 1 or 2, (II)

wherein $R_2$ and $R_4$ are each independently, alkyl groups having from 1 to 10 carbon atoms, $R_3$ and $R_5$ are each independently, alkyl groups having from 1 to 3 carbon atoms and m and p are each independently, 0, 1 or 2, at a weight ratio of (A) to (B) of from 1:1 to 2:1;

b) filtering the mixture obtained in a) to eliminate dispersed contaminating agents, or alternatively or filtering the components (A) and (B) separately before the mixing a);

c) filling one or more moulds by injection and subsequent polymerisation of the liquid composition for heat treatment at temperatures varying from 30 to 110° C. and with polymerisation times varying from 1 hour to 30 hours;

wherein the prepolymer is obtained by reaction of the at least one cycloaliphatic diisocyanate monomer with the at least one polyol catalyzed by the acid phosphate ester of formula I and/or formula II, with the proviso that no polyalkoxylated tertiary diamine or metal organic catalyst is present in the reaction composition.

6. The method according to claim 5, wherein the phosphate acid ester is present in reacted form with the cycloaliphatic diisocyanate.

7. The method according to claim 5, wherein an aliphatic tertiary amine is added in a).

8. An organic glass obtained by the method of claim 5.

9. An optical manufactured product comprising the organic glass according to claim 8.

10. The optical manufactured product according to claim 9, wherein the product is one selected from the group consisting of ophthalmic lenses, solar filters, Fresnel lenses, protective and safety shields, inspection holes, solar collectors, solar photovoltaic panels, substrates for optical discs, display panels, visual display units, optical guides, components for mobile phones, and transparent pipes.

11. The polymerizable composition according to claim 4, wherein the aliphatic tertiary amine is a sterically hindered amine.

* * * * *